Aug. 24, 1965  L. H. ERICKSON  3,202,847
TUNABLE VIBRATION PICK-UP DEVICE
Filed July 28, 1960  2 Sheets-Sheet 2
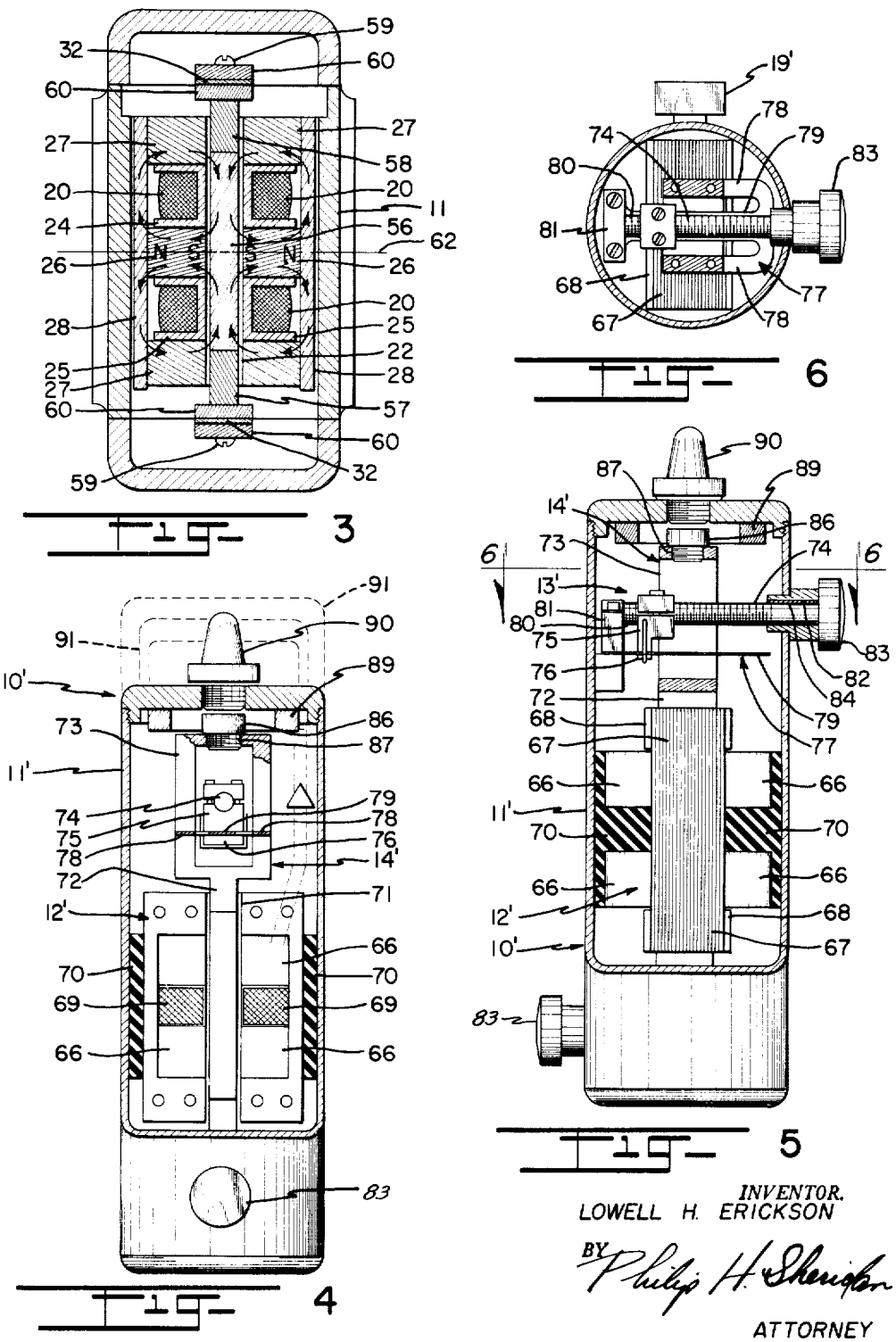
INVENTOR.
LOWELL H. ERICKSON
BY Philip H. Sheridan
ATTORNEY

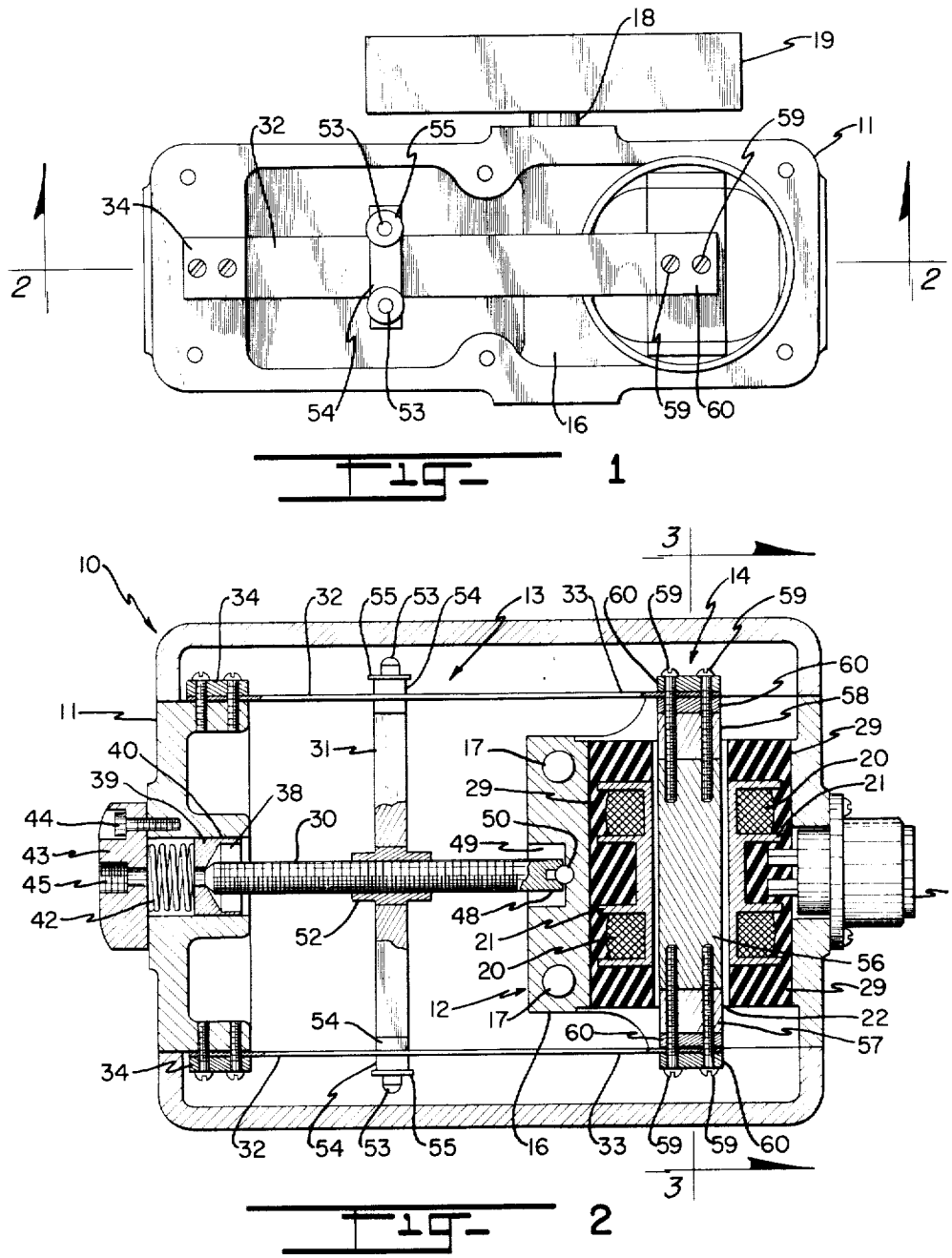

United States Patent Office 3,202,847
Patented Aug. 24, 1965

3,202,847
TUNABLE VIBRATION PICK-UP DEVICE
Lowell H. Erickson, Denver, Colo., assignor to Marcellus S. Merrill, Denver, Colo.
Filed July 28, 1960, Ser. No. 45,844
1 Claim. (Cl. 310—14)

This invention relates to a novel and improved device capable of generating an electrical voltage output in response to mechanical vibration and in such a way as to afford a dependable and accurate means of measuring the amplitude of such vibration. More particularly, this invention has relation to an adjustable type of resonant frequency vibration pick-up device which is adaptable for use in driving a recorder for a continuous record of the vibration, or for driving other means such as a sensitive meter relay for operating an alarm system, or a meter and stroboscope electronic unit for the purpose of determining and correcting unbalance in rotating machinery operating under its own power.

In accordance with the present invention, it is a principal object thereof to provide for an improved device for measurement of vibration, and moreover to provide for a pick-up device which is capable of being mechanically tuned so as to resonate at the frequency of the vibration to be detected to produce a high capacity electrical output for measurement or operation of associated instruments.

It is another object of the present invention to provide a vibration pick-up device which is self-generating for the development of an electrical output directly proportional to the vibration amplitude of the source notwithstanding wide variations in amplitude, and more specifically is capable of generating a high voltage output with respect to the amplitude of vibration of the source.

It is a further object to provide for a vibration pick-up device which has high mechanical stability in the presence of relatively large magnetic forces and is capable of performing as an excellent driver for vibrating various devices where pure sign wave vibrations are required, and with direct mechanical correction being incorporated in the system.

It is a still further object to provide for an adjustable resonant frequency vibration pick-up device which is reliable and dependable in operation, is highly sensitive and accurate, and is capable at the same time of producing a high capacity electrical output in the form of a linear response to the amplitude of vibrations of the source.

It is an additional object of the present invention to provide for a way of mounting an armature assembly in a vibration pick-up device to be linearly responsive to the vibratory source over wide frequency and amplitude ranges for producing a high electrical voltage output, and in general is compact, highly sensitive and greatly simplified in operation.

The above and other objects of the invention will become more readily understood from the following description taken together with the accompanying drawings in which:

FIGURE 1 is a top view of a preferred form of pick-up device, with the cover removed, illustrating the relative disposition of parts in accordance with the present invention;

FIGURE 2 is a section view taken on line 2—2 of FIGURE 1;

FIGURE 3 is a section view taken on line 3—3 of FIGURE 2;

FIGURE 4 is a view, partially in section, of a modified form of pick-up device in accordance with the present invention;

FIGURE 5 is another view, partially in section, of the modified form; and

FIGURE 6 is a section view taken on line 6—6 of FIGURE 5.

Referring in detail to the drawings, there is shown by way of illustrative example in FIGURES 1-3 a preferred form of vibration pick-up unit 10 broadly comprised of a generally rectangular housing 11 which serves to enclose a magnetic field assembly or circuit 12, a slider assembly 13 and an armature assembly 14 associated with the slider assembly for reciprocal movement through the magnetic field circuit 12. A male electrical end connector 15 is also shown connected into the magnetic field circuit and projecting from one end of the housing.

The magnetic field circuit 12 consists of a generally oblong body portion having along one side a flat metallic connecting plate 16 with mounting holes 17 therein, and the mounting holes 17 are dimensioned and sized for alignment with corresponding recess portions 18 on the housing for connection to a vibratory source, represented at 19. The vibratory source may for example take the form of some suitable rotating mechanism or body operating under its own power and where it is desired to measure the vibration amplitude of the mechanism and to correct unbalance in that system by measuring the amplitude of vibration and applying the necessary correction thereto. Accordingly, the output or end connector 15 serves as a means of connection of the pick-up device to some suitable meter or recorder, not shown, for conduction of the voltage developed by the pick-up device. The voltage level in a manner to be described is developed to correspond with the amplitude of vibration of the source 19.

As shown in FIGURES 2 and 3, the magnetic circuit 12 is made up of a pair of coils 20 mounted in longitudinally spaced relation in annular frames 21, and the frames essentially define a central longitudinal opening 22 and specifically are formed to provide upper and lower channel-shaped members 24 and 25 for mounting of the coils. Surrounding the ends and outsides of the coils 20 are diametrically opposed magnetic members, as is best seen from FIGURE 3, each being generally E-shaped in configuration and defining a center magnet 26 between the coils, end pieces 27 to the outside of each coil and outer elongate plates 28. The coils may be suitably composed of cold-rolled steel which serve as the main pick-up members of the device in which voltage is induced and conducted across the connector 15. Additionally, the magnetic field circuit pieces along with the coils 20 are preferably potted in a plastic material 29 with the opening 22 left to extend through the center thereof. Potting of the assembly of course effectively integrates the entire assembly, eliminates moisture problems and provides excellent mechanical stability of the coils and leads, not shown, which connect the coils into the connector. It also makes it possible for the pick-up unit to withstand long periods of vibration without danger of open coils or leads.

The slider assembly 13 primarily functions to provide for centered suspension of the armature assembly 14 in the central opening 22 of the magnetic field circuit and to establish accurate sensitive adjustment of the tuning frequency of the armature assembly to correspond with the frequency of vibration of the mechanical source 19. To this end, the slider assembly is constructed of a horizontal screw member 30 for threaded connection of a vertical slider arm 31 thereon, and at opposed ends of the slider arm there are slidably disposed upper and lower springs 32. One end of each spring is attached to the housing through keepers 34, and the springs are extended horizontally away from the connected end with free ends 33 disposed to lie in spaced relation above and below the ends of the magnetic field circuit. Additionally, the free ends 33 are aligned with the longitudinal axis of the central opening 22 for connection of the armature assembly 14.

As seen from FIGURE 2, the horizontal screw 30 has a tapered portion 38 which is slotted at its end, and portion 38 is designed to engage a slotted piece 39 positioned in an opening 40 in the housing. Behind the slotted piece 39 is a coil spring 42, and to maintain the spring under tension to bear against the slotted piece 39, a cap 43 is attached over the opening 40 and secured in place by cap screws 44. A screw plug 45 is removably disposed in the cap, and the end of the screw 30 is slotted or otherwise suitably formed to permit engagement by a wrench for rotation thereof. The screw 30 is proportioned for extension from the opening 40 horizontally across the housing with an opposite socketed end 48 projecting into a recess 49 in the plate 16. A steel ball 50 is positioned in the end surface of the recess to engage the socketed end 48 and to hold the screw tightly in place. In this relation, the horizontal screw 30 is therefore mounted under compression to prevent the introduction of slack into the screw when the slider arm 31 is mounted thereon.

A slider arm 31 is supported on the horizontal screw 30 by means of threaded sleeve 52, and each end of the slider arm has a pair of spaced apart posts 53 to permit slidable clamping of the spring members 32 between mounting plates 54. Washers 55 are formed to fit in snug relation on the posts to sandwich the springs between the plates 54. The plates 54 may be lubricated or formed of a low-friction plastic material, such as, Teflon, to permit the arm 31 to slide easily along the springs 32.

It will be observed that by removing the plug 45, adjustment of the screw 30 may be made with the use of a suitable wrench to cause linear advancement of the slider arm 31 along the springs 32. In this way, the position of the slider arm along the springs will determine the vibration frequency of the armature assembly 14 suspended at the free end of the springs in response to vibration of source 19.

The armature assembly 14, depending upon the cross-sectional configuration of the central opening 22, may for example be rectangular or circular in cross-section. In the preferred form it is illustrated as a member of rectangular cross-section including an intermediate portion 56 formed of high permeability magnetic material, such as soft iron, non-magnetic supporting pieces 57 and 58 at the ends of the armature, and clamping screws 59 with plates 60 are positioned at each end of the armature assembly to secure the armature to the free ends of the springs 32. In this relation will be noted that the armature assembly is symmetrically formed in relation to the magnetic field circuit. For example, in normal centered relation the intermediate portion 56 will be opposite the coils and project an even distance therebeyond at either end; similarly, the non-magnetic supporting pieces 57 and 58 are of equal lengths and extend outwardly from the end of the intermediate portion equal distances relative to the end pieces 27. The purpose of this relationship will be readily seen from a consideration of FIGURE 3 where it will be noted that the center magnets 26 develop magnetic flux in response to movement of the armature through parallel magnetic paths on either side of center line 62 as indicated by the arrows. The magnetic flux effectively splits at the north poles of each of the magnets with one portion traveling upward and the remainder downward into the outer thickness of the magnet members, then through the end pieces 27 and across the air gaps to the magnetic portion 56 of the armature assembly; it then travels back to the south poles of the magnet to complete the circuit. It will be noted that the cross-sectional areas of the air gaps between the field circuit and armature cover approximately one-half of the exposed areas of the magnetic end pieces 27. From this relationship, as the armature vibrates longitudinally, the cross-sectional area of the air gap will increase proportionally to the armature movement at one end and decrease a like amount at the opposite end. Consequently, the magnetic reluctance change at each end is proportional to the changes in area. This in turn causes proportional changes in the magnetic flux. Therefore, the magnetic flux increases through one coil and decreases a like amount through the other coil and in turn induces voltages in the pick-up coils proportional to the flux changes, and the two coils may be connected in series with polarity relationships such that the two voltages will be additive.

It is important in mounting the pick-up device to the vibratory source that the magnetic forces applied to the armature are transverse to the length of the armature supporting springs 32 and in the same direction as the flux paths through the air gap, as illustrated in FIGURE 3. For this reason, the longitudinal travel of the armature is made to correspond with the principal direction of vibration of the vibratory source so that in this way the armature will be primarily sensitive to vibration in a direction parallel to the major vibratory influence. Otherwise, if the main forces were applied parallel to the armature supporting springs they would cause either compression or tension in the springs with serious resultant non-linearities, particularly when thin springs are used in order to obtain the lowest resonant frequency. In this connection, maximum response of the armature will occur when its resonant frequency is tuned by means of the slider assembly through the frequency of the vibration being sensed. Specifically, this is of course accomplished through regulating the disposition of the slider arm 31 to the spring 32 since the distance between the armature and the slider arm will govern the frequency of vibration of the armature. It is also important that the end pieces 27 extend as far as the magnetic portion of the armature travels so that in this way excellent linearity of the electrical output with respect to large armature excursions will be obtained.

On occasion, it is necessary to employ the pick-up device of the present invention in a vertical position at very low frequencies. In this situation it is highly desirable that the armature supporting springs be very soft so that the armature may sag to the limit of its excursion. Offset springs, not shown, may be employed to maintain the armature in centered relation; in the alternative, a direct current may be conducted through the coils to induce the armature to return to the centered or balanced position without affecting the generation of voltage.

In the modified form of FIGURES 4 to 6 there is illustrated a pick-up unit 10' having a generally cylindrical housing 11' and in which is positioned again a magnetic field circuit 12', a slider assembly 13' and an armature assembly 14' mounted by means of the slider assembly for reciprocal movement through the field circuit 12'. The arrangement of the modified form is fundamentally designed for operation in the same manner as in the preferred form by connection to the vibratory source to be measured, not shown. In this form, the magnetic members are defined by diametrically opposed magnetic laminations 67 which serve effectively the same function as the end pieces 27 and plates 28 of the preferred form to provide a path for the magnetic flux developed, and the laminations are held tightly together by means of non-magnetic straps 68. Positioned between the coils 66 are a pair of magnets 69, and a potting resin 70 is again employed to integrate the entire field circuit and forms a central opening 71 for extension of the armature assembly 14'.

The armature assembly 14' is defined by the armature proper 72 having an upward extension in the form of a generally open, non-magnetic, rectangular frame 73 which serves as a support and connecting means for the armature to the slider assembly. The slider assemly 13' is then positioned in relation to the armature and magnetic field circuit essentially for the purpose of minimizing the effects of gravity on reciprocal movement of the armature while retaining a high sensitivity. The slider assembly therefore consists of a horizontal screw 74 extending through the center of the frame 73 with a slider arm 75 positioned for translatory movement along the screw. The slider arm 75 includes a lower end portion 76 which is divided for reception of a spring member 77, the spring being in the form of a thin flexible strip, preferably of beryllium copper. In this instance the spring is generally W-shaped having its outer ends 78 anchored within the frame 73 and an intermediate portion 79 anchored in place within the slotted end 76 of the slider arm.

The horizontal screw 74 is positioned for rotation within the housing 11' by inserting the end 80 in journaled relation in a bearing block 81 mounted in the housing, and the block 81 also receives the end of the intermediate portion 79 of spring 77. The opposite end of the screw projects through the housing and includes a flat spring member 82 inserted within a slot provided in an adjusting handle 83 which is positioned in opening 84 in the housing. The purpose of the spring 82 is to relieve the slider screw of all play so that vibration sensed by the case will be transmitted to the spring 77 which supports the armature without lost motion. In rotating the handle 83, the screw will be immediately responsive to rotate a corresponding amount and to cause accurate longitudinal movement of the slider arm 75 with the lower end sliding along the spring 77 in the same manner as in the preferred form.

Although not fully shown in FIGURES 4–6, it is to be observed that identical slider assemblies 13' may be mounted for connection to each end of the armature assembly 14'. Preferably, the slider assemblies are reversed in relation to one another so that, as shown in FIGURE 5 for example, the upper and lower adjusting knobs 83 project from the housing at 180 degrees to one another. In this relation the device is particularly useful for horizontal mounting to the vibrating source; that is, the armature extends horizontally, rather than vertically as illustrated. In this position the slider assemblies would be vertically disposed with the free spring ends centered in relation to the opening in order to mount the armature in evenly spaced relation within the magnetic circuit. Due to the reverse disposition of the slider assemblies it will be seen that the free ends 78 of one spring 77 will be in compression and the other free ends in tension, resulting from the weight of the armature. By securing the armature in this manner, gravitational effects are substantially eliminated and the reverse mounting of the slider assembles largely offsets one another so as to permit free vibratory movement of the armature through the circuit.

It will be seen from FIGURE 5 that the closed ends of the springs 77 are free to oscillate so that advancement of each arm toward the bearing support 81 will reduce the frequency of vibration of the armature in response to vibration of the exterior source. Adjustment in frequency is made by manipulating the handles to cause longitudinal movement of the slider arms along the screw members. In positioning the springs of each slider assembly in this relation a high sensitivity may be obtained in transmitting vibration from the source into the armature assembly for reciprocation in the magnetic field circuit while largely overcoming the effect of gravity. Here the strength of the springs will play some part also in supporting the armature in centered relation and in resisting the effect of gravity.

As an additional feature of this invention it also may be desirable to employ some means of amplification of the vibration and this may be carried out through the use of an auxiliary magnet 86 shown positioned in a threaded opening 87 in the top of the frame 73; surrounding the auxiliary magnet is a driver coil 89 secured to the top of the housing. An amplifier 90 may be interconnected between the pick-up coils and the driver coil with the input side of the amplifier connected to the pick-up coil and the output side connected to the driver coil as represented by dotted lines in FIGURE 4. By interconnection with the correct phase relationship between the driver coil and the pick-up coil it is possible to maintain the armature in oscillation and to greatly magnify its oscillation in response to vibrations of the source 19'. On the other hand, by reversing the pick-up unit and driver terminals it is possible to induce a considerable amount of damping into the pick-up coils so as to closely control the gain of the magnetic field circuit in the development of voltage. Utilization of the auxiliary magnet and driver coil with suitable amplification is highly desirable with portable balancing equipment such as the type employing a stroboscopic light source wherein the voltage generator could be used as a source of power for energizing the light source. The pick-up can then be tuned to the operating speed of the equipment to be balanced by adjusting the slider assembly until the rotating or vibratory part of the equipment appears to be stationary. In this connection, other procedures as outlined in Patent No. 2,798,379 entitled "Apparatus for Determining the Unbalance of a Rotating Body in Situ" are desirably employed for determining the correct frequency because the machine will appear to be stationary also at submultiples and multiples of its operating speed.

To further illustrate the conformability of the modified form of invention for use under varied conditions, a removable prod 90 is shown and upon removal, together with the auxiliary magnet 86, attachment can be made directly between the armature and source, rather than to the housing, for direct sensing of vibration, or for supporting the device so that the housing can be resonated in order to cover lower ranges of frequencies. In addition, or as an alternative, weights 91 can be attached to the housing in order to lower the frequency range of vibration of the device.

In general it is important that large clearances be maintained between the vibrating and stationary parts especially to prevent interference with the vibration of the armature. In both forms relatively long spring members may be employed to reduce the arc of travel of the armature assembly and to make it more nearly a straight line movement through the magnetic field circuit, although it is apparent that the relative size of the opening to the armature is another important requirement.

As a practical measure, the armature should be maintained in centered relation to the magnetic field circuit as described. For example, when altering the installation of the armature assembly from horizontal to vertical movement gravity is introduced as an offsetting influence tending to pull the armature away from center. To counteract this, and as stated previously, it is possible to introduce D.C. current into the coils to effectively maintain the armature in centered relation; or, offset springs may be employed to continuously urge the armature toward the center position without in any way affecting the linearity characteristics of the armature.

In connection with the preferred and modified forms it will be evident that many of the features thereof are interchangeable with one another. For example, the use of amplification as described in the modified form may be employed in the preferred form or in any unit of this type where it is desired to induce self-oscillation into the armature and to amplify the vibration induced therein. Moreover, laminated or solid magnetic pieces may be employed as desired.

When the pick-up device of the present invention is properly installed to be responsive to the primary vibrations of the source 19, tuning of the armature assembly is easily accompilshed through fine adjustment of the screw in the slider assembly, until the frequencies of the armature and the source correspond. Through this expedient, measurement through suitable instrumentation of the voltage level generated in the field circuit will provide a direct indication of the amplitude of vibration. Moreover, due to the symmetrical relationship between the armature and field circuit and the magnetic flux path derived, linear response of the output to changes in amplitude over a wide range is made possible. Of course, it is not absolutely necessary to establish resonancy of the armature but much truer response and recording is attained in this manner.

Accordingly, it is to be understood that various modifications and changes may be made in the present invention without departing from the scope therein as defined by the appended claim and equivalents thereof.

What is claimed is:

A voltage generating pick-up device for measuring amplitudes of vibrations of a vibration source through the generation of voltages corresponding to said amplitudes, comprising in combination: a housing to be attached to said source whereby said vibrations are transmitted to the housing; means forming a magnetic field circuit mounted in said housing provided with a central opening; an armature extending through said opening and forming an air gap between it and the magnetic circuit means and supported in a position to vibrate in a direction corresponding with the principal direction of vibration of said source; means for sensing voltages induced by vibration of said armature in said direction and transmitting them to a recording means; a pair of flat spring members mounted at one end of said housing at longitudinally spaced apart points and supporting said armature in said position between their free ends; a connecting plate fixed in said housing adjacent said field circuit means between said spring; a slotted member mounted in said one end of said housing; a threaded screw member rotatably mounted between said connecting plate and said slotted member; a slider threadably attached to said screw member for movement therealong as the screw is rotated, said slider having clamping means at either end for clamping each of its ends to a spring member; and resilient means between said slotted member and said housing spring biasing said screw member against longitudinal movement.

References Cited by the Examiner

UNITED STATES PATENTS

| | | | |
|---|---|---|---|
| 1,823,326 | 9/31 | Legg | 310—25 |
| 2,424,724 | 7/47 | Tolk | 310—25 |
| 2,487,029 | 11/49 | Piety | 310—25 |
| 2,509,210 | 5/50 | Clark | 310—25 |
| 2,596,048 | 5/52 | Severs | 310—25 |
| 2,604,181 | 7/52 | Basham | 310—25 |
| 2,788,512 | 4/57 | Reichert | 340—17 |
| 2,800,796 | 7/57 | Westcott | 310—25 |
| 2,946,218 | 7/60 | Karpchuk | 310—25 |
| 2,971,323 | 2/61 | Hetzel | 310—25 |
| 3,026,428 | 3/62 | French | 310—25 |

FOREIGN PATENTS

| | | |
|---|---|---|
| 1,008,651 | 5/52 | France. |

ORIS L. RADER, *Primary Examiner.*

MILTON O. HIRSHFIELD, *Examiner.*